(12) United States Patent
Samek et al.

(10) Patent No.: US 8,579,200 B2
(45) Date of Patent: Nov. 12, 2013

(54) PARALLEL DECODING SCHEME FOR AN INDICIA READER

(71) Applicant: Metrologic Instruments, Inc., Blackwood, NJ (US)

(72) Inventors: Justin Samek, Voorhees, NJ (US); James A. Nahill, Turnersville, NJ (US)

(73) Assignee: Hand Held Products, Inc., Fort Mill, SC (US)

(*) Notice: Subject to any disclaimer, the term of this patent is extended or adjusted under 35 U.S.C. 154(b) by 0 days.

(21) Appl. No.: 13/668,956

(22) Filed: Nov. 5, 2012

(65) Prior Publication Data

US 2013/0240626 A1  Sep. 19, 2013

Related U.S. Application Data

(63) Continuation of application No. 12/688,150, filed on Jan. 15, 2010, now Pat. No. 8,302,868.

(51) Int. Cl.
*G06K 7/10* (2006.01)

(52) U.S. Cl.
USPC ............... 235/470; 235/462.07; 235/375

(58) Field of Classification Search
USPC .......... 235/470, 487, 462.1, 375, 454, 462.07
See application file for complete search history.

(56) References Cited

U.S. PATENT DOCUMENTS

| | | | |
|---|---|---|---|
| 5,449,893 A | 9/1995 | Bridgelall et al. |
| 5,756,981 A | 5/1998 | Roustaei et al. |
| 6,176,429 B1 | 1/2001 | Reddersen et al. |
| 6,505,778 B1 | 1/2003 | Reddersen et al. |
| 6,672,511 B1 | 1/2004 | Shellhammer |
| 7,007,846 B2 | 3/2006 | Shellhammer |
| 7,190,835 B2 | 3/2007 | Durbin et al. |
| 7,325,737 B2 | 2/2008 | Epshteyn et al. |
| 7,409,606 B2 | 8/2008 | Nakai |
| 2004/0031850 A1 | 2/2004 | Shellhammer |
| 2006/0081712 A1 | 4/2006 | Rudeen et al. |
| 2007/0119939 A1 | 5/2007 | Epshteyn et al. |
| 2007/0228176 A1 | 10/2007 | Vinograder et al. |
| 2009/0078773 A1 | 3/2009 | Carlson et al. |

*Primary Examiner* — Edwyn Labaze
(74) *Attorney, Agent, or Firm* — Additon, Higgins, Pendleton & Ashe, P.A.

(57) ABSTRACT

A method for collecting and processing information bearing indicia (IBI) comprising the steps of: converting light reflected off an IBI into IBI signals representative of the IBI; running at least one signal process for processing the IBI signals on a first processor if the IBI is of a first type; and running at least one signal process for processing the IBI signals on a second processor if the IBI is of a second type, wherein the first processor and second processor are configured to run in parallel.

14 Claims, 6 Drawing Sheets

Fig. 7

PARALLEL DECODING SCHEME FOR AN INDICIA READER

CROSS REFERENCE TO RELATED APPLICATIONS

This application is a continuation of U.S. patent application Ser. No. 12/688,150 filed Jan. 15, 2010 entitled, "Parallel Decoding Scheme for an Indicia Reader." The above application is incorporated herein by reference in its entirety.

FIELD OF THE INVENTION

The present invention relates to indicia reading devices, and more particularly to an indicia reading device utilizing parallel decoding.

BACKGROUND

Indicia reading devices (also referred to as scanners, image reader, indicia readers, etc.) typically read data represented by printed indicia, (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Laser indicia reading devices typically utilize transmitted laser light.

One-dimensional (1D) optical bar code readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (20) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a remote computer.

Some data collection devices, such as hand-held indicia readers, are capable of capturing images as well as reading barcodes. The reading and decoding of a barcode represents an operation distinct from that involved in capturing an image. The reading and decoding of a bar code involves the imaging and then decoding of a one or two dimensional graphic symbol into the alphanumeric, full ASCII or other data sequence encoded by the symbol. The capturing of an image involves storing an electronic visual copy/representation of the image.

Efforts regarding such systems have led to continuing developments to improve their versatility, practicality and efficiency.

DETAILED DESCRIPTION

The invention features a system and method for automatically discriminating between different types of data with an indicia reader. A human operator may aim a hand-held indicia reader at a target containing a form, information bearing indicia (IBI) or dataform, text, or other element and actuate a trigger on an indicia reader. An IBI or dataform may be an originally machine generated symbology that is also machine readable, such as a 1-D barcode, a 2-D barcode, a 1-D stacked barcode, a logo, glyphs, color-codes, and the like.

When using an embodiment of an indicia reader, a human operator may intuitively point the reader directly at the data to be collected, regardless of its type, and actuate a trigger.

Figure 1:
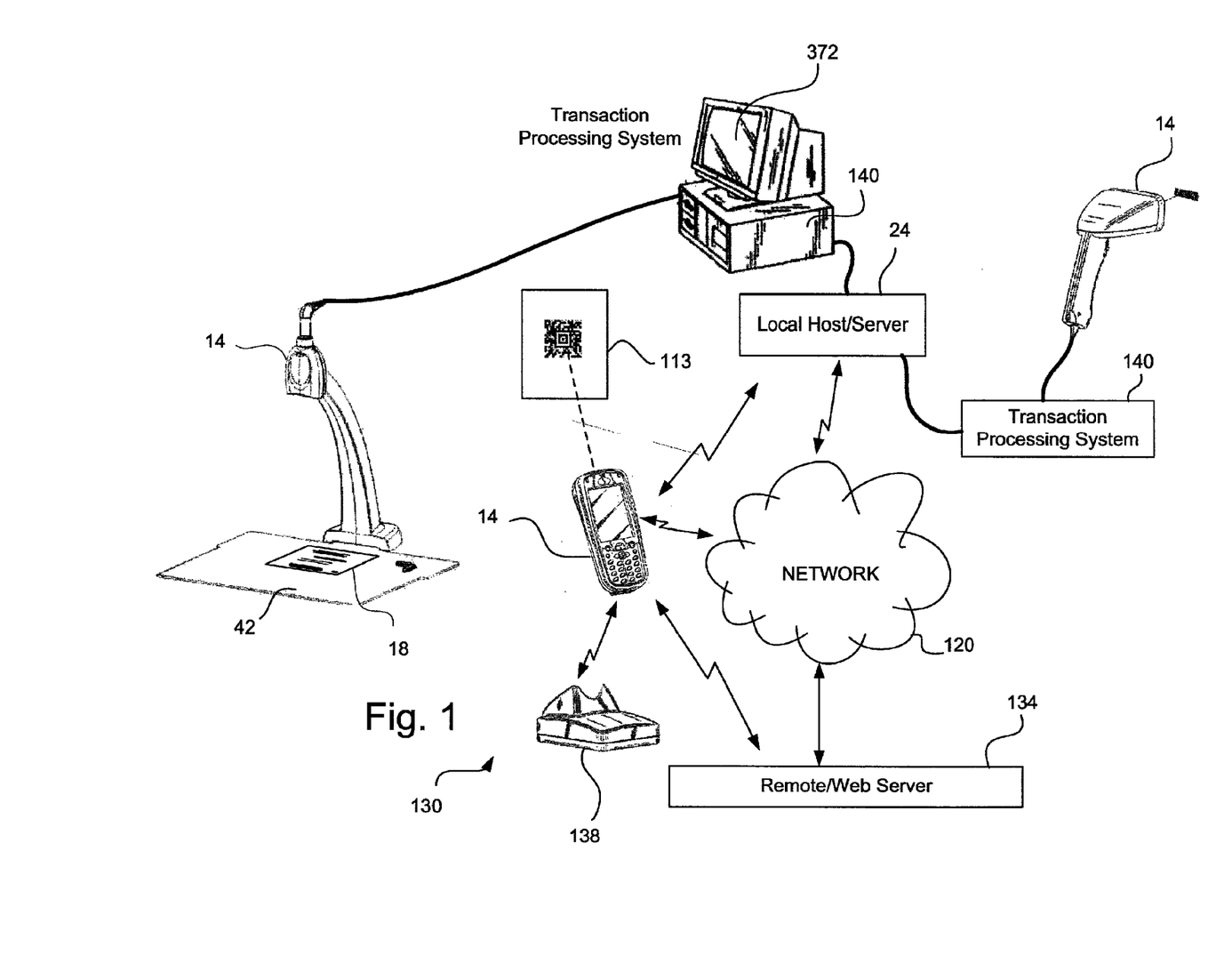
FIG. 1 is a block diagram of an exemplary indicia reader system.

FIG. 1 illustrates a scanning system configuration in accordance with the present invention, wherein a plurality of indicia readers 14 are being operated or utilized in a facility, such as a retail store. An exemplary indicia reader has an image sensor which digitizes a representative image seen in an imaging field of view. The indicia readers may be in communication (wired or wireless) to a local transaction processing system 140, such as a cash register, customer station or employee station. The transaction processing systems 140 may be in communication (wired or wireless) with a local server 24.

Figure 2:
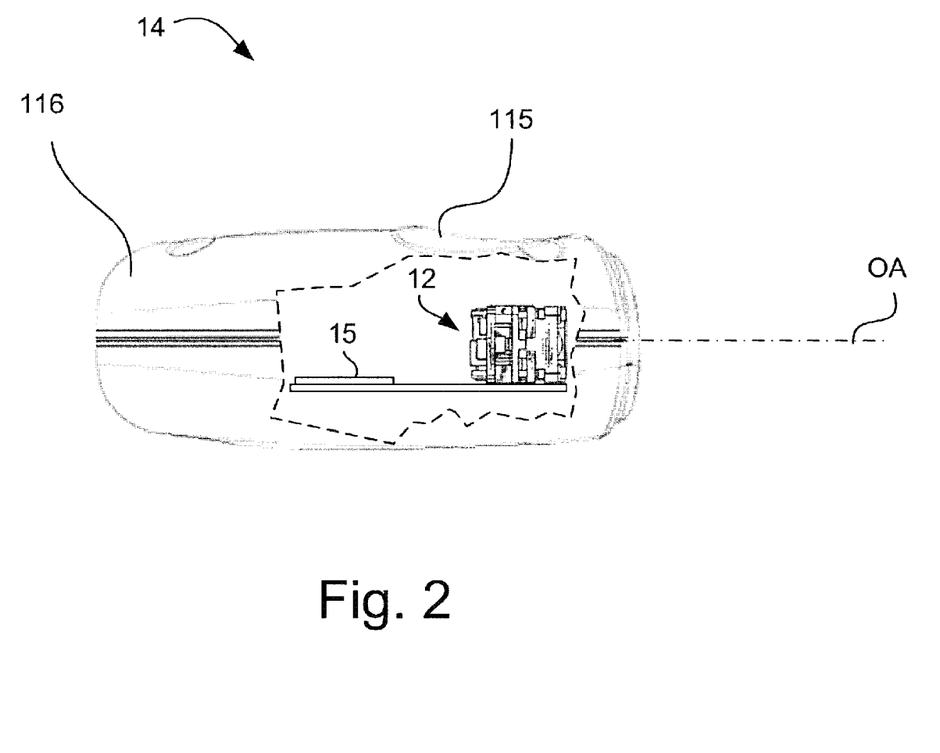
FIG. 2 is a fragmentary partially cutaway side view of an exemplary indicia reader.
Figure 3:
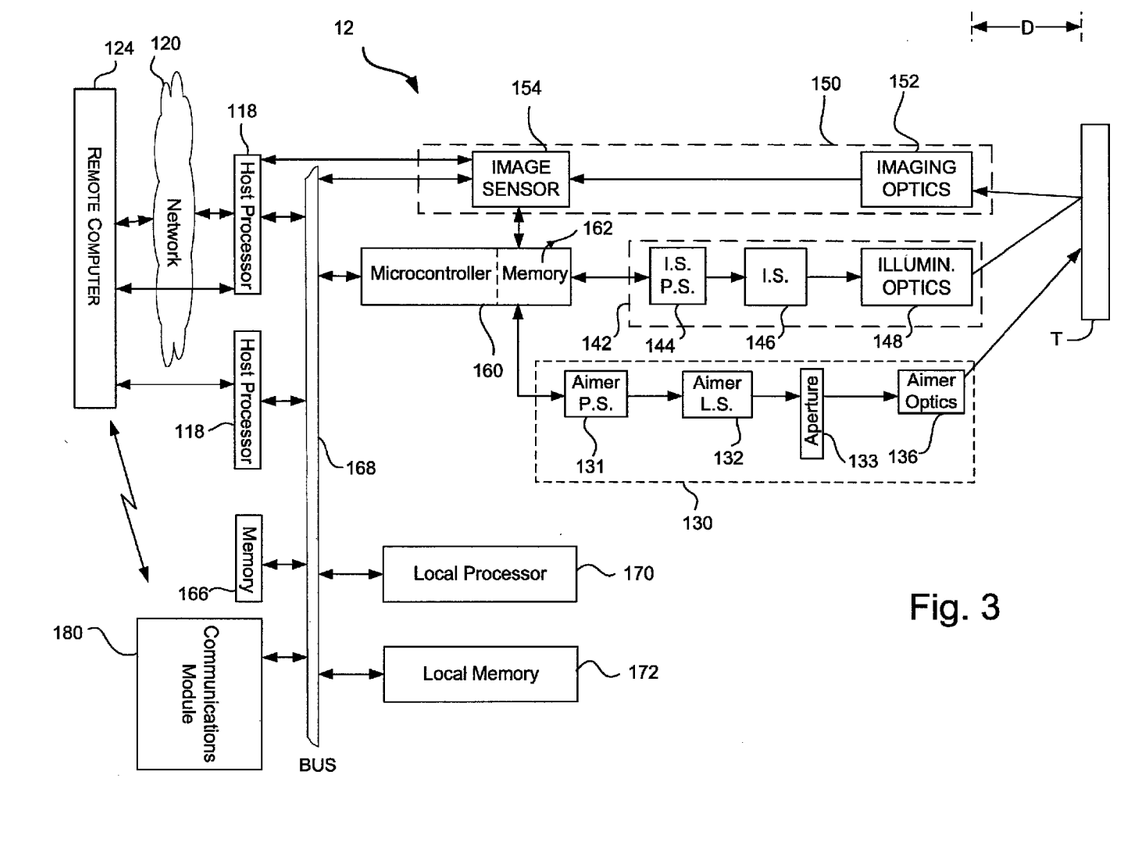
FIG. 3 is a block schematic diagram of an exemplary reader module.

Referring to FIGS. 2 and 3, an optical indicia reader 14 may have a number of subsystems for capturing and reading images, some of which may have symbol indicia provided therein. Reader 14 may have an imaging reader assembly 12 provided within a head portion or housing 116 which may be configured to be hand held by an operator. A trigger 115 may be used to control operation of the reader 14. Indicia reader assembly 12 has imaging receive optics 152 having an optical axis (OA) for receiving light reflected from a target T and directing or projecting the reflected light from the target I to an image sensor 154. The optical axis is a line of symmetry through the imaging optics.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus.

The target may be any object or substrate and may bear a 1D or 2D bar code symbol or text or other machine readable indicia. A trigger 115 may be used for controlling full or partial operation of the reader 14.

Image sensor 154 may be a one or two-dimensional array of pixels adapted or configured to operate in a rolling shutter, global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc. or model number VC5602V036 36CLCC from STMicroelectronics.

Further description of image sensor operation is provided in commonly owned U.S. patent application Ser. No. 11/077, 995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

It is to be noted that the image sensor 154 may read images with illumination from a source other than illumination source 146, such as by illumination from a source located remote from the reader.

The output of the image sensor may be processed utilizing one or more functions or algorithms to condition the signal appropriately for use in further processing downstream, including being digitized to provide a digitized image of target T. Digitizing or digitization may be representing an object, an image, or a signal (usually an analog signal) by a discrete set of its points or samples. The result is called "digital representation" or, more specifically, a "digital image", for the object, and "digital form", for the signal. Digitization may be performed by reading an analog signal A, and, at regular time intervals (sampling frequency), representing the value of A at that point by an integer. Each such reading is called a sample.

A microcontroller 160 may perform a number of processing functions and be located on board with other components, such as the image sensor. The particulars of the functionality of microcontroller 160 may be determined by or based upon certain configuration settings or data which may be stored in remote or local memory 162, 166, 172. One such function may be controlling the amount of illumination provided by illumination source 146 by controlling the output power provided by illumination source power supply 144. Microcontroller 160 may also control other functions and devices.

An exemplary microcontroller 160 is a mixed-signal array with on-chip controller devices designed to replace multiple traditional MCU-based system components with one single-chip programmable device. It may include configurable blocks of analog and digital logic, as well as programmable interconnects.

Microcontroller 160 may include a predetermined amount of memory 162 for storing firmware and data. The firmware may be a software program or set of instructions embedded in or programmed on the microcontroller which provides the necessary instructions for how the microcontroller operates and communicates with other hardware. The firmware may be stored in the flash memory (ROM) of the microcontroller as a binary image file and may be erased and rewritten. The firmware may be considered "semi-permanent" since it remains the same unless it is updated. This firmware update or load may be handled by a device driver.

The components in reader 14 may be connected by one or more bus 168, data lines or other signal or data communication form. Exemplary forms may be an Inter-IC bus such as a two wire interface (TWI), dedicated data bus, RS232 interface, USB, etc.

A TWI bus is a control bus that provides a communications link between integrated circuits in a system. This bus may connect to a host computer in relatively close proximity, on or off the same printed circuit board as used by the imaging device. TWI is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

A host processor 118 or a local processor 170 may be utilized to perform a number of functional operation, which may involve the performance of a number of related steps, the particulars of which may be determined by or based upon certain configuration settings stored in memory 166 which may be any one of a number of memory types such as RAM, ROM, EEPROM, etc. In addition some memory functions may be stored in memory 162 provided as part of the microcontroller 160.

An exemplary function of a processor 118, 170 may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, OR-code, or other 2D symbologies. UPC/EAN bar codes are used as the standard to mark retail products throughout North America, Europe and several other countries throughout the worlds. Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

Imaging reader assembly 12 may also have an aiming generator light source 132, aiming aperture 133, aiming optics 136, an illumination source(s) 146 and illumination optics 148.

Illumination and aiming light sources with different colors may be employed. For example, in one such embodiment the indicia reader may include white and red LEDs, red and green LEDs, white, red, and green LEDs, or some other combination chosen in response to, for example, the color of the symbols most commonly imaged by the indicia reader. Different colored LEDs may be each alternatively pulsed at a level in accordance with an overall power budget.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source may comprise any light source which is sufficiently small or concise and bright to provide a desired illumination pattern at the target. For example, light source 132 for aiming generator 130 may comprise one or more LEDs.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis. Alternately, the aimer pattern generator may be a laser pattern generator.

The light sources 132 may also be comprised of one or more laser diodes such as those available from Rohm. In this case a laser collimation lens (not shown in these drawings) will focus the laser light to a spot generally forward of the scanning hear and approximately at the plane of the target T. This beam may then be imaged through a diffractive interference pattern generating element, such as a holographic element fabricated with the desired pattern in mind.

Indicia reader may include an illumination assembly 142 for illuminating target area T. Illumination assembly 142 may also include one or more power supplies 144, illumination sources 146 and illumination optics 148.

A communications module 180 provides a communication link from imaging reader 14 to other imaging readers or to other systems such as a server/remote processor 124.

The processor, memory and associated circuitry which performs or controls the exemplary image capture and decoding functions may be provided in the indicia reader assembly 12 or on associated circuit boards 15 which are located within the housing 116 of the indicia reader 14.

In an exemplary embodiment the illumination source may be a laser for reflecting laser light off the target. This may be referred to laser scanning wherein the reflected laser light is converted into signals reflected off an IBI into IBI signals representative of the IBI. An aiming pattern generator may not be necessary in such an embodiment if the illumination laser provides an aiming function in addition to an illumination function.

Exemplary functions of a processor or processors 118, 170 may be to facilitate operation of the image capture function, decoding functions, and operator interface functions. Operating software may be utilized to operate the processor for such functions seemingly simultaneously or in a multitasking role. An exemplary image reader operating software architecture may be organized into processes or threads of execution.

In an exemplary embodiment, utilizing multiple processors may be a way for an indicia reader to fork (or split) itself into two or more parallel or simultaneously (or pseudo-simultaneously) running decoding tasks. Running decode operations in parallel may allow decode operations to split out specialized processing in order to reach a decode decision faster. Exemplary processors may be configured to run in parallel through a common communications link.

In an exemplary embodiment different types of symbologies may be decoded utilizing different processors. For example, EAN/UPC codes may be decoded on one processor and GS-1 codes may be decoded on a separate processor.

In an another example, 2D codes may be decoded on a main/host processor and 1D codes may be decoded on a separate processor, such as an on board processor located within the image engine.

Exemplary processing may be performed by separate processing units connected by an array of common memory.

In exemplary embodiments, processing may be achieved in multiple ways to achieve the same or a similar result.

In an exemplary embodiment a symbol may be processed or decoded by more than one processor in parallel or simultaneously utilizing different decoding algorithms, wherein the first processor to finish successfully decoding provides the decoded information for further processing by a transaction system and sends an interrupt to the other processor(s) to stop decoding the symbol. An exemplary interrupt may be sent over a common communications link.

Multiple equivalent single core processors may be utilized to allow operating system, firmware or hardware logic to split processing into multiple tasks or operations across more than one processor. Multiple lower performance processors may split tasks that normally would require a more powerful processor by combining the power of two or more lesser processors running in parallel.

High performance processor and a lower performance processor (or ASIC) may be utilized to conduct primary functions with the high performance processor and offload secondary tasks to the lower performance processor.

A multi-core processor having multiple logic units (i.e. cores) on one substrate (i.e. the processor) may be utilized, which would allow one processor to operate on multiple threads in parallel.

Utilization of multiple threads may be a way for a processor program to fork (or split) itself into two or more simultaneously (or pseudo-simultaneously) running tasks. Threads and processes may differ from one operating system to another. An exemplary definition of a thread is a path of execution. In an operating system, a thread consists of a copy of the system registers and a private stack space. This is known as the thread context. A process is comprised of one or more threads and memory space they can use. The memory space included in the process space is where each individual thread has its private stack space. Typically, different threads of the same process can share some resources while threads of different processes may not unless the operating system provides a method for doing so.

Multiple threads may be executed in parallel when a multi-core processor or multiple processors are available. On a single processor, multithreading generally occurs by time slicing (similar to time-division multiplexing), wherein the processor can cycle through the available threads. In this example the processing is not literally simultaneous, because the single processor is performing one function at a time. This switching may happen so fast the illusion of simultaneity is given to an end user. For example, one processor may run multiple programs at once, such as decoding an information bearing indicia (IBI) while evaluating an image being taken for future decoding. Though the user experiences these things as simultaneous the processor is quickly switching back and forth between these separate tasks. On a multiprocessor or multi-core system, true simultaneous threading may be achieved via multiprocessing, where different threads which are either from the same process or from multiple processes run simultaneously on different processors or cores.

As discussed, a single processor or single core processor may only run one thread at a time. A thread is run by loading that thread's register data, which is part of the thread context, into the processor registers. Once this is done, the program counter register will begin executing instructions and using data from the information loaded in the thread context.

Switching between different threads consists of swapping out the context data of the running thread from the processor's register space and replacing it with the context data of another thread. This starts by saving the register data currently in the processor into a first thread's context space, and then loading a second thread's register data from its context space into the processor registers.

Operating systems may schedule threads in one of two ways. Preemptive multithreading is an approach which allows the operating system to determine when a context switch should occur. Because the operating system is making that decision, a context switch can occur at any time. Therefore, developers of multithreaded applications in preemptive environments need to plan that context switches can occur anywhere. This involves putting protection around areas where memory is shared to ensure that the program cannot get into an undefined state. It also means making sure that software functions are reentrant, meaning that there are no places where having multiple threads call a function at the same time could either cause undefined states or cause the function to somehow not perform correctly. Cooperative multithreading, on the other hand, relies on the threads themselves to relinquish control once they are at a stopping point. This can make development simpler because the developer controls when a given thread stops execution, and therefore can ensure that sensitive areas run to completion. However, it can cause a problem if a thread is suspended with a valuable resource that another thread needs. In this case you may have one thread waiting for a resource which is held by a suspended thread, possibly resulting in a deadlock.

Figure 4:
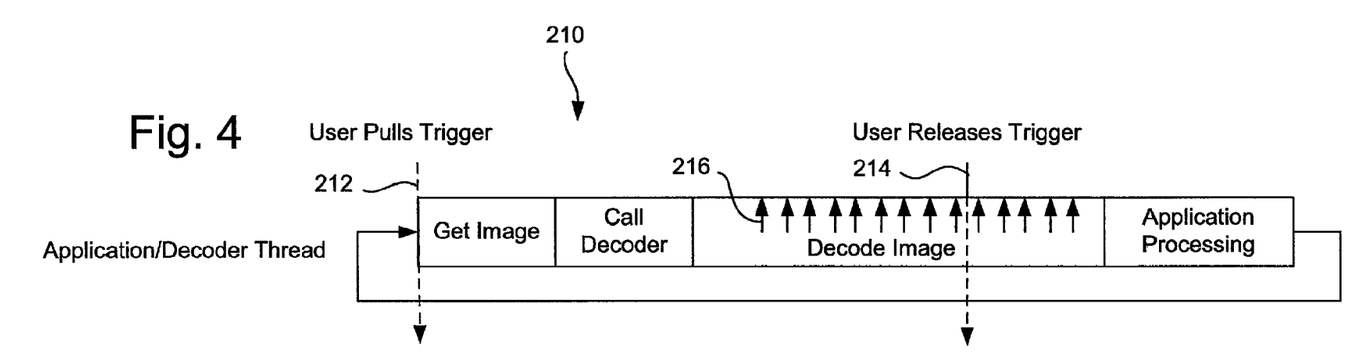
FIG. 4 is an illustration of an exemplary processing scheme for operating an indicia reader.

Referring to FIG. 4, an exemplary image reader operating system thread is illustrated, wherein a singular application/decoder thread 210 comprises a sequence wherein a user triggers an event, such as by pulling a trigger 212 to take an image and retrieve it or releasing the trigger 214. The decoder analyzes the image to decode one or more IBIs provided therein. During decoding, outside events may sometimes influence the image reader processing. For example, when decoding an image an operator may let go of the image reader trigger, which will cause decoding to stop and exit processing. Other events such as timeouts, or requests to retrieve new images which have a higher probability for success may cause the decoder to stop and in some cases start decoding a new image. In FIG. 4, the decoder uses a polling mechanism to query for such events which might cause it to exit. A function allowing continuation of the decoding process is called frequently by the decoder which looks at the events and makes a determination if decoding may continue. If the determination is made that the decoder may continue, the function exits and the decoder continues decoding. However, if the determination is made that the decoder should exit, the function returns and the decoder is responsible for exiting so that other non-decoding related tasks can run. This type of event tracking is referred to as "polling" and is represented by arrows 216 in FIG. 4.

Figure 5:
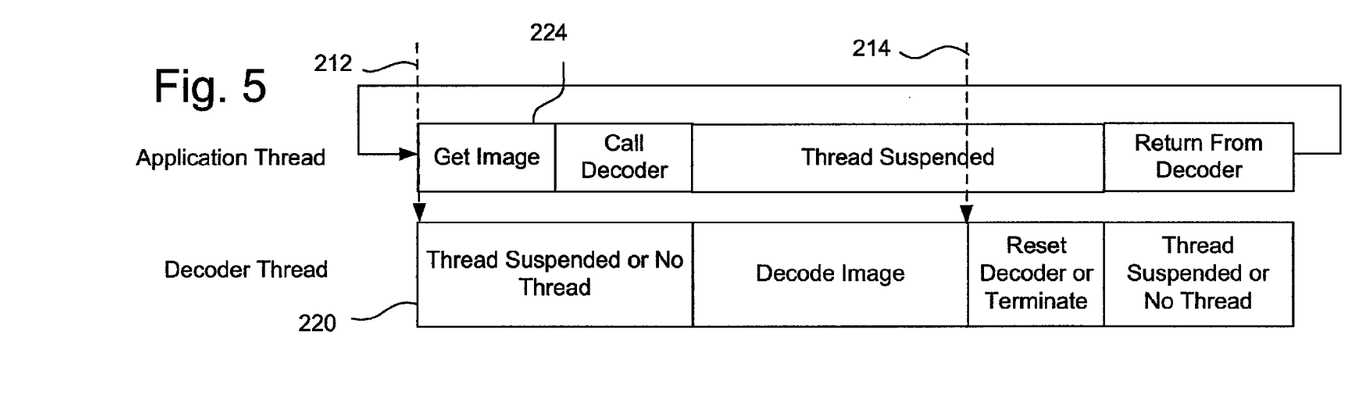
FIG. 5 is an illustration of an exemplary processing scheme for operating an indicia reader.

Referring to FIG. 5, an exemplary embodiment for an operating system for running an image reader processor is illustrated wherein decode algorithms are run as a separate thread 220 (known as the "decoder thread") from the "application thread" 224 which calls the decoder to run. When the application thread calls the decoder, the path of that thread may call a decoder shell function which may include the setup of data structures the decoder will work on. The application thread may then signal the decode thread to run, and either block while allowing the decoder thread to operate and decode the image, as shown in FIG. 5, or the application thread may return from the decoder shell function and wait for some type of signal from the decoder thread indicating the processing of that image is completed, which is not shown in any figures. In the case shown in FIG. 5, upon completion of the running of the decoder, the decoder thread either blocks or terminates and by doing so allows the application thread to continue to run which would exit the decoder shell function.

In FIG. 4, event handling is done by the decoder polling the system to determine if any events happened which would cause the decoder to have to exit. In the example shown in FIG. 5 event handling is done outside of the decoder thread to facilitate an "event driven" system where event processing is performed as a result of the event instead of the polled example where checking is done to see if an event has happened. The result is less overhead because event processing is only done when an event actually happens as opposed to polling where event processing is occurring whether an event happened or not.

Events such as timeouts, a trigger pull 212, a trigger release 214, a periodic event, a synchronous event, an asynchronous event, a serial event, a communication event, or other events that affect the decoder will take action to drive a response in the decoder on the event occurrence.

In an exemplary embodiment, two responses by the decoder thread to an event may be to keep processing the image or stop processing the image. Part of the shell function operation, which is called by the application thread, may be the operation of creating the decoder thread. In this case, when an event occurred which makes it desirable to stop decoding, the event may terminate the decoding thread, thereby allowing the application thread to exit the decoder shell function almost immediately to grab a new image, create a new decoder thread and then restart the decoding thread again.

Sometimes the process of terminating and creating a new thread may be too slow, or due to the nature of thread termination may leave memory stack space allocated which may cause a memory leak by repeatedly terminating and creating new threads. Therefore, in an exemplary embodiment, the threads may be reset rather than terminated. The core of every thread is the thread context. The thread context contains a current register state, and memory stack information. The process of resetting of a thread may be accomplished by recording the thread context at a known location in the program, and reloading that thread context at the time when a thread is to be reset. When this is done, the thread will resume execution at the known location exactly as it performed when the context was recorded.

When a thread is terminated or reset, memory space allocated by that thread needs to be freed. This starts by either tracking the individual memory allocations performed by this thread, or having a dedicated heap space for that thread where all memory allocations are taken from. Upon termination or reset, all of the memory allocations granted to that thread are freed by one of the threads running on the system. In the case of terminating a thread, stack space also needs to be considered as memory allocated for that thread. When a thread is terminated and then created again, the same stack space could be used. Or if stack allocation is part of the thread creation routines, one needs to be sure that the stack of the thread being terminated has been freed.

Terminating or resetting of a decoding thread may happen anywhere at any time, being driven by an event. Because event handling may be done outside of the decoder, event response may have no bearing on decoder design.

In the polled event handling example represented in FIG. 4, event response performance may be dependent upon both the speed of the platform and the frequency of the polling which has to be figured into the design of the decoding processing.

In the exemplary embodiment illustrated in FIG. 5 using event driven event handling, the decoder design may be separated from the platform design, because event response is done by the event handling software which is not a part of the decoding software. Such decode processing may be any of a number of types of processing (image processing or otherwise) where an outside event could make a determination of whether or not to terminate that processing.

In an exemplary embodiment, multiple threads (and different types of threads) may be running during reader operation. Exemplary threads are a scan driver thread, an application thread, an event handling thread, one or more decoder threads or other types of miscellaneous threads. The different threads may or may not run simultaneously. Some event recognized in the application thread may start the decoder thread.

Figure 6:
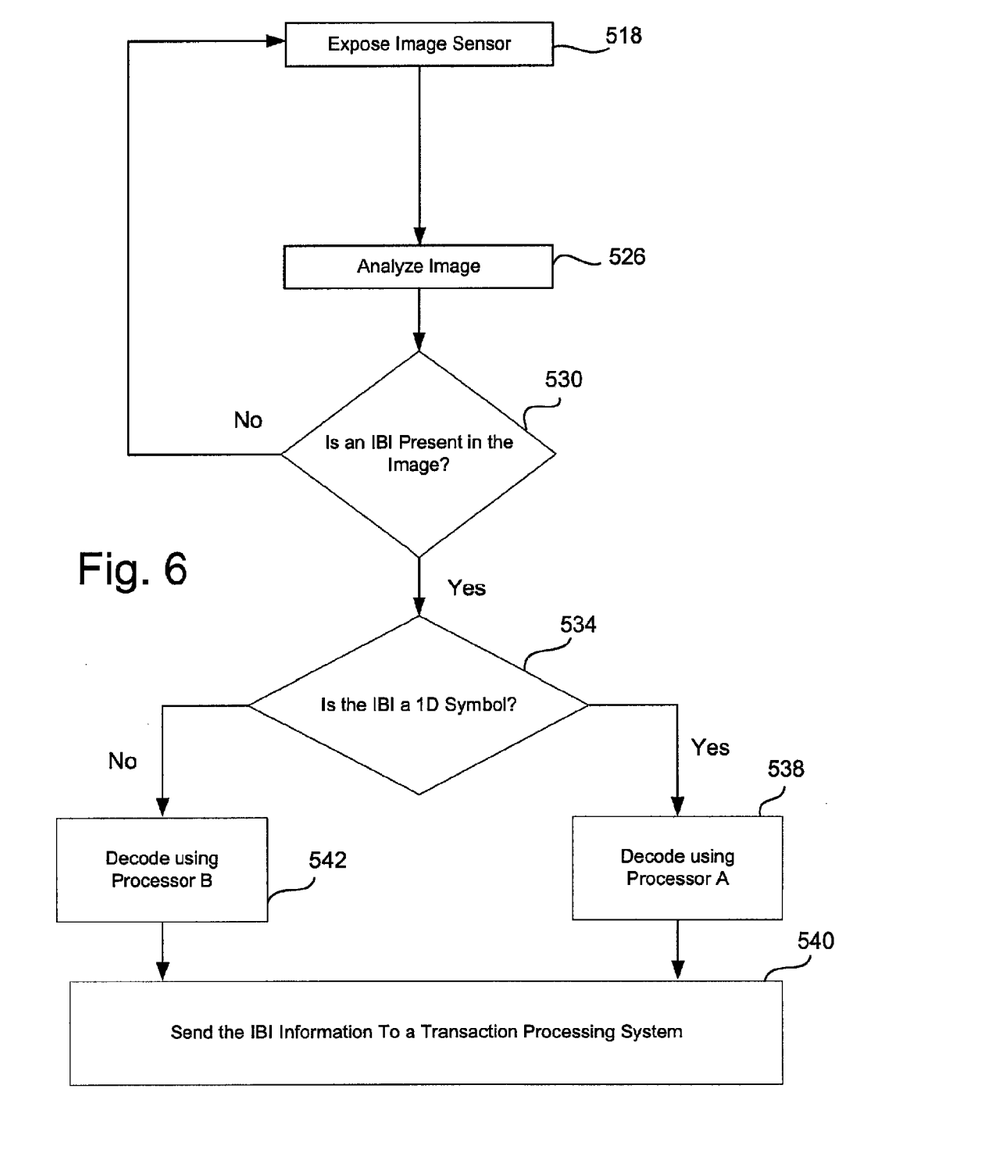
FIG. 6 is an flow chart of an exemplary processing scheme for operating and indicia reader.

FIG. 6 is an exemplary method of processing an image wherein an image sensor disposed on an indicia reader is exposed in a step 518. A programmed processor analyzes the displayed image in a step 526. A query is made in a step 530 whether there is an IBI present in the image. If no, another exposure is taken in step 518. If an IBI is detected in the image a query is made if the IBI is a 1D symbol in a step 534. If yes, the IBI is decoded by processor A in a step 538 and the decoded information is transmitted to a transaction processing system or a host device or system in a step 540 to be utilized by the establishment. If the IBI is not a 1D symbol the IBI is decoded by processor B in a step 542 and the decoded information is transmitted to the transaction processing system or a host device or system in step 540.

What is described herein is an exemplary apparatus for collecting and processing information bearing indicia (IBI) comprising: a converter for converting light reflected off an IBI into IBI signals representative of the IBI; a first processor adapted or configured for running at least one signal process for processing the IBI signals if the IBI is of a first type; and a second processor adapted or configured for running at least one signal process for processing the IBI signals if the IBI is of a second type, wherein the first processor and second processor are adapted or configured to run in parallel independently and simultaneously.

Figure 7:
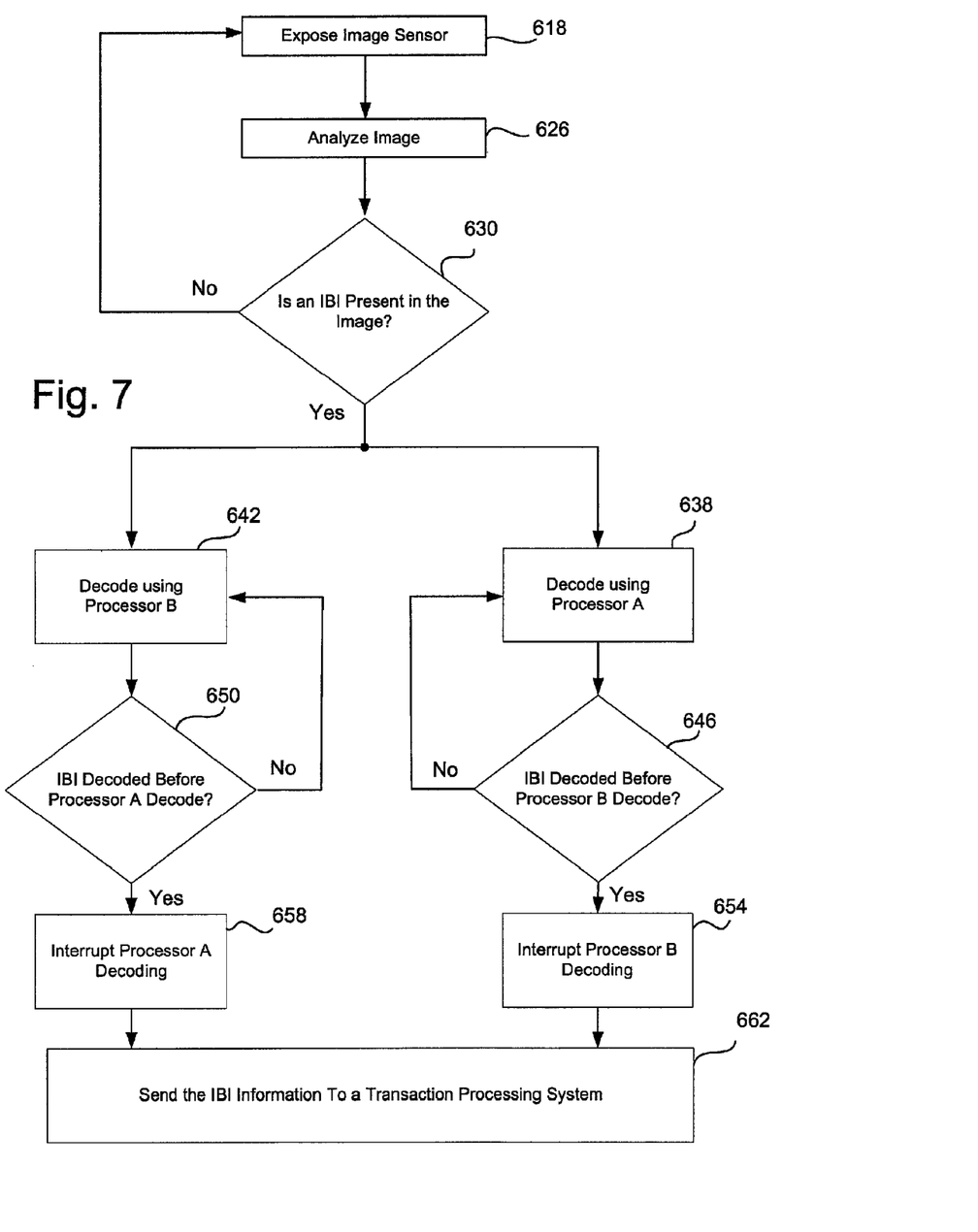
FIG. 7 is an flow chart of an exemplary processing scheme for operating and indicia reader.

FIG. 7 is an exemplary method of processing an image wherein an image sensor disposed on an indicia reader is exposed in a step 618. A programmed processor analyzes the displayed image in a step 626. A query is made in a step 630 whether there is an IBI present in the image. If no, another exposure is taken in step 618. If an IBI is detected in the image the IBI is decoded in parallel running steps 638, 642 by a Processor A and Processor B, respectively. A query is made in a step 646 if the IBI is decoded by Processor A before it's decoded by Processor B. If no, Processor A continues to attempt decoding the IBI. If Processor A decodes the IBI before Processor B, it sends an interrupt to Processor B to stop decoding in a step 654 and the decoded information is transmitted to the transaction processing system or a host device or system in step 662. A query is also made in a step 650 if the IBI is decoded by Processor B before it's decoded by Processor A. If no, Processor B continues to attempt decoding the IBI. If Processor B decodes the IBI before Processor A, it sends an interrupt to Processor A to stop decoding in a step 658 and the decoded information is transmitted to the transaction processing system or a host device or system step 662.

What is described herein is an exemplary apparatus for collecting and processing information bearing indicia (IBI) comprising: a converter for converting light reflected off an IBI into IBI signals representative of the IBI; a first processor adapted or configured for running at least one signal process for processing the 1 BI signals if the IBI is of a first type; and a second processor adapted or configured for running at least one signal process for processing the IBI signals if the IBI is of a second type, wherein the first processor and second processor are adapted or configured to run in parallel independently and simultaneously.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. An apparatus for collecting and processing information bearing indicia (IBI) comprising:
   a hand held housing;
   a converter for converting light reflected off an IBI into IBI signals representative of the IBI;
   a first processor configured for running a first signal process for processing the IBI signals if the IBI is of a first type; and
   a second processor configured for running a second signal process for processing the IBI signals if the IBI is of a second type,
   wherein the first processor and second processor run the first and second signal processes in parallel and independent of each other, and
   wherein at least a portion of the processing may be achieved via multiprocessing, where different processing threads run simultaneously on the same processor.

2. An apparatus in accordance with claim 1, wherein the IBI of a first type is a 1D symbol and the IBI of a second type is a 2D symbol.

3. An apparatus in accordance with claim 1, wherein the first and second processors are part of a multi-core processor having multiple logic units on one substrate.

4. An apparatus in accordance with claim 1, wherein signal processes comprise at least one of the following: decoding; image processing and signal processing.

5. An apparatus in accordance with claim 1, wherein the converting is accomplished utilizing a linear image sensor or an image sensor array.

6. An apparatus in accordance with claim 1, wherein the first and second processors are configured to run in parallel through a common communications link.

7. An apparatus in accordance with claim 1, wherein the first and second processors are connected by an array of common memory.

8. An apparatus for collecting and processing information bearing indicia (IBI) comprising:
- a hand held housing;
- a converter for converting light reflected off an IBI into IBI signals representative of the IBI;
- a first processor configured for running a first signal process for processing the IBI signals if the IBI is of a first type; and
- a second processor configured for running a second signal process for processing the IBI signals if the IBI is of a second type,
- wherein the first processor and second processor run the first and second signal processes in parallel and independent of each other, and
- wherein at least a portion of the processing may be achieved via multiprocessing, where different processing threads run consecutively on the same processor.

9. An apparatus in accordance with claim 8, wherein the IBI of a first type is a 1D symbol and the IBI of a second type is a 2D symbol.

10. An apparatus in accordance with claim 8, wherein the first and second processors are part of a multi-core processor having multiple logic units on one substrate.

11. An apparatus in accordance with claim 8, wherein signal processes comprise at least one of the following: decoding; image processing and signal processing.

12. An apparatus in accordance with claim 8, wherein the converting is accomplished utilizing a linear image sensor or an image sensor array.

13. An apparatus in accordance with claim 8, wherein the first and second processors are configured to run in parallel through a common communications link.

14. An apparatus in accordance with claim 8, wherein the first and second processors are connected by an array of common memory.

* * * * *